Oct. 16, 1956 M. BURGHARDT 2,766,991
APPARATUS FOR SPREADING DRY MATERIALS
Filed Aug. 23, 1951 2 Sheets-Sheet 2
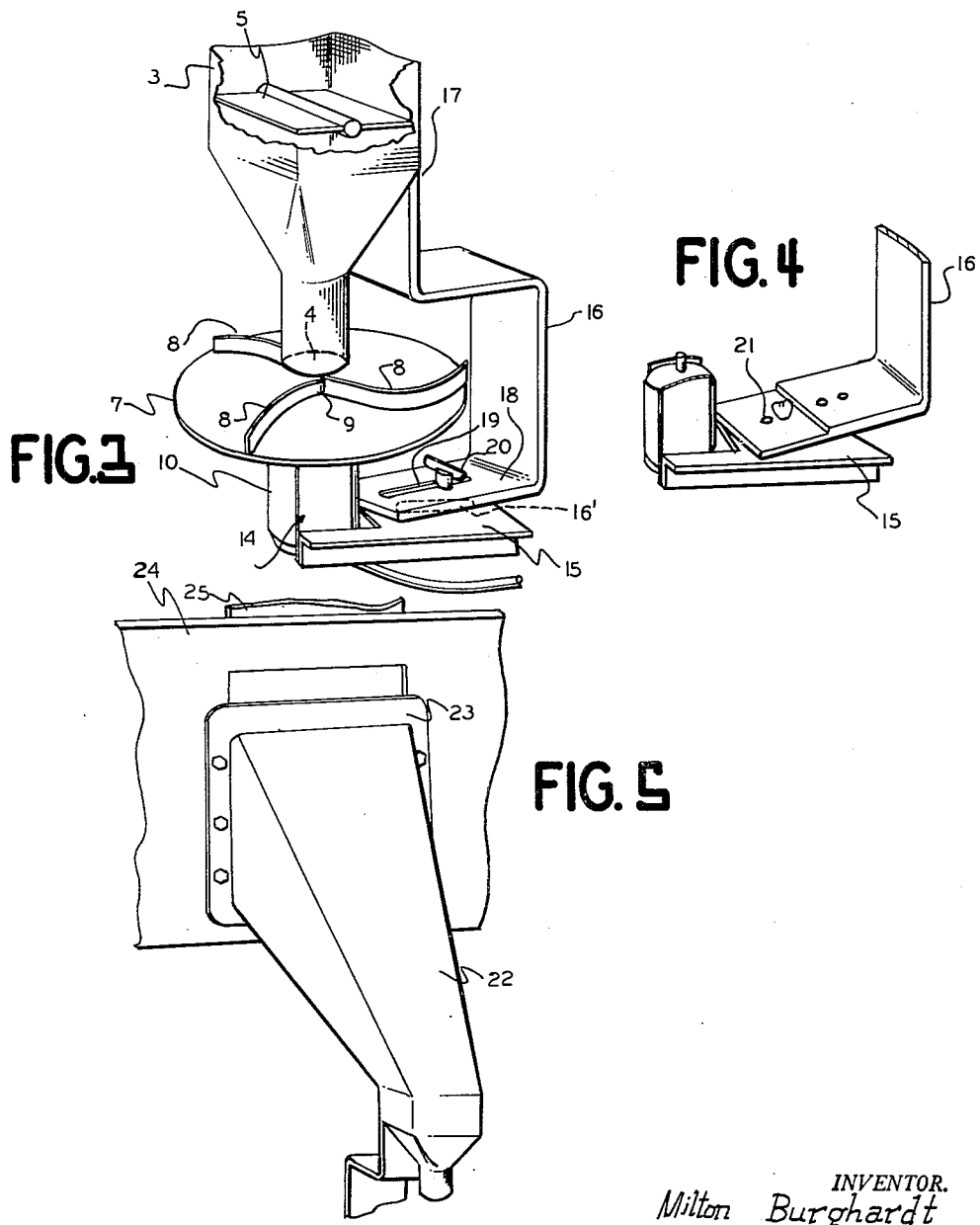
INVENTOR.
Milton Burghardt
BY Ezekiel Wolf
his Attorney United States Patent Office 2,766,991
Patented Oct. 16, 1956

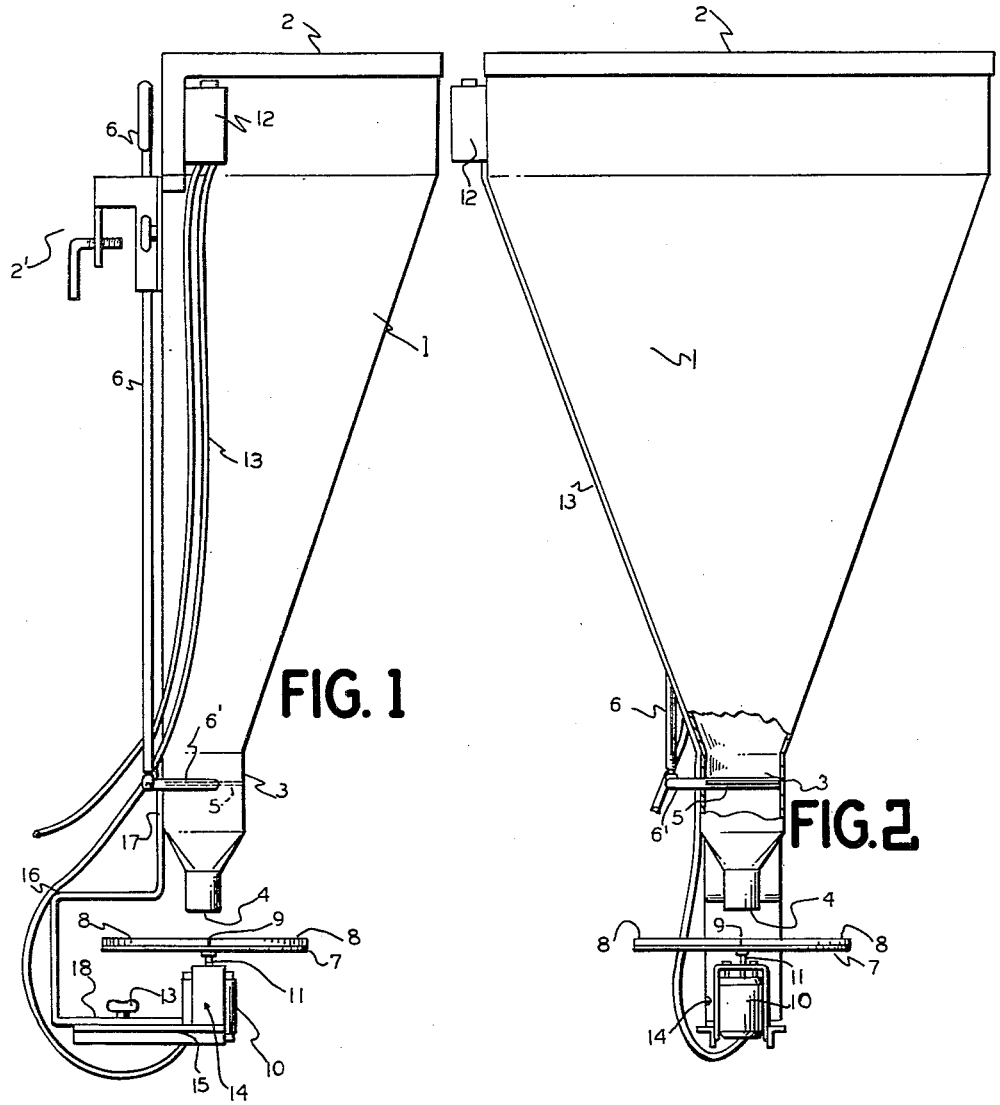

2,766,991

APPARATUS FOR SPREADING DRY MATERIALS

Milton Burghardt, Dartmouth, Mass.

Application August 23, 1951, Serial No. 243,331

5 Claims. (Cl. 275—8)

The present invention relates to a spreader for spreading such substances as salt, sand, nitrates and other chemicals in particle form and particularly for spreading such materials over slippery or icy roads.

When roads become icy or slippery in winter, highway crews are sent out in trucks equipped with sanding devices to spread sand and salt on the roads. Not only do the roads, on which spreading is done, vary greatly in width, but also there are many other factors wherein it becomes essential to govern the quantity of material spread, the angle of spread, area and the variation of each of the elements as the spreading is done.

In the present invention, such materials or chemicals are placed in a feeder hopper, or passing from the truck through a chute, go through an orifice in the bottom of the hopper onto a motor driven revolving plate having curved flanges projecting from its upper surface, which propel the material onto the surface of the road.

Further, various adjustments on the feeder hopper controlling the rate of flow of material onto the plate, as well as adjustments controlling the rate with which the plate revolves and its exact positioning under the hopper, provide complete control of the spreading operation.

A valve just above the lower orifice of the feeder hopper controls the rate of flow of material out of the hopper onto the revolving disc and consequently controls the density with which the material is spread.

By varying the rotational speed of the plate or disc, the area and distance at which the material is spread may be varied.

The motor and plate are mounted below the hopper on an adjustable arm whereby any part of the revolving plate may be placed below the orifice in the hopper through which the material falls, consequently permitting an adjustment to be made with regard to the direction in which the material is propelled by the revolving plate.

These and other advantages of the present invention will be more clearly understood when considered in conjunction with the embodiment as illustrated in the drawings, in which:

Figure 1 is a side elevation of the present invention.

Figure 2 is a front elevation of the present invention with a section of the feeder hopper broken away showing the valve assembly.

Figure 3 is a fragmentary perspective view of the lower part of the feeder hopper and the motor driven plate.

Figure 4 is a fragmentary perspective of a modification of the adjustable arm holding the motor driven plate.

Figure 5 is a fragmentary perspective of a modification of the feeder hopper element when used in conjunction with a motor truck having a tail-board and tail-gate.

Referring now to Figures 1 and 2, a feeder hopper 1 having a top open end 2 is vertically attached to the rear tail-board of a truck by any suitable means, such as a pair of clamps 2'. The hopper tapers to a small section 3 at its bottom end in which a butterfly valve 5 is positioned and terminates in an orifice 4. The butterfly valve controls the rate of flow with which material in the hopper 1 will pass through the orifice 4. This valve 5 is connected to a vertically extending operating rod 6 by a crank arm 6' pivoted through the side of the hopper. This rod may be operated by the same person placing material in the open top 2 of the hopper. A plate or disc 7 mounted just below the orifice 4 has a series of projecting vanes 8 from its upper surface curving outward from a common center 9, which may coincide with the axis of rotation of the plate in such a manner that when the disc is revolved in a clockwise direction, the convex sides of the vanes 8 will be the leading edges. (See Figure 3.)

In the embodiment as shown in the drawing, the plate is shown as a disc with the vanes extending outwardly from its central axis. However the plate may be other than circular in shape, and further the vanes need not extend from a common center provided that when the material falls onto the revolving plate, it will be propelled outwardly by the moving vanes.

The plate 7 is supported and turned by a drive shaft 11 of the motor 10 which is mounted with the motor shaft positioned vertically. If desired a reduction gear may be incorporated in the motor so that the drive shaft may revolve slower.

The speed with which this motor turns the disc in a clockwise direction is regulated by a rheostat or other type of control 12 shown connected in the power lines 13 running to the truck battery or power source. This rheostat control 12 is positioned on the hopper near its upper end so as to be readily accessible to the operator of the spreading device. The motor housing is rigidly attached to an irregularly shaped arm 14 having a horizontal plate section 15 in which there is a longitudinally extending slot 16'. A bracket 16 has one end 17 firmly attached to the lower part of the hopper and its other end extending below the plate 7 with a horizontal section 18 in juxtaposition to the horizontal plate section 15. A slot 19 similar in shape and size to the slot 16' in the element 15 extends lengthwise in the horizontal section 18, so that a wing nut and bolt 20 may readily clamp the element 15 and the horizontal section 18 together. By loosening the nut and bolt, the arm 14 with the motor 10 and the plate 7 may be moved in any direction in a horizontal plane permitting any desired part of the plate 7 to be moved under the orifice 4. By suitably positioning the plate 7, the material falling through the orifice 4 may be thrown in the desired direction. For example, placing the left hand side of the disc under the orifice 4 will cause the material to be thrown to the left side of the road when the spreader is in operation.

Figure 4 illustrates a modification of the arm and bracket element of Figure 3, whereby a series of holes 21 are provided in each member in place of the slots 16' and 19 to receive the nut and bolt. This construction, while not permitting continuous adjustment, fixes the relative positions of the bracket and arm so that no slipping will take place.

Figure 5 shows a modification of the hopper whereby a chute 22 is attached by a flange 23 in front of a gate 25 in the tail-board 24 of a truck.

The open mouth of the chute need not cover the entire longitudinal opening in the tailboard since the tailgate may be lowered to cover the open portion above the mouth of the chute. The use of a truck having a tailgate eliminates the need of a valve in the throat of the hopper since the raising and lowering of the tailgate may be used to control the flow of material through the orifice 4.

Having now described my invention, I claim:

1. A material spreading device of the type described comprising means having a chute and an orifice facing downward for directing the flow of material out of the orifice, a plate having upwardly projecting vane elements extending radially outwardly from a center, a motor having a shaft rotatably supporting said plate, a bracket extending downward from said chute having an arm extending outward beneath said orifice, said motor having a supporting arm, and means provided in said motor supporting arm and in the arm extending outward from said bracket permitting movement of the plate for adjusting the radial and circumferential distance of the orifice from the axis of rotation of the plate established by the motor shaft.

2. A material spreading device of the type described comprising means having a chute and an orifice facing downward for directing the flow of material out of the orifice, a plate having upwardly projecting vane elements extending radially outwardly from a center, a motor having a vertical shaft on which said plate is mounted, means having an arm extending outwardly from the motor for supporting the same, a bracket extending from said chute having a branch in juxtaposition to said arm, and means including said branch and arm for horizontally adjusting the position of the plate with reference to the said orifice whereby the location of the orifice relative to the axis of rotation of the plate established by the motor shaft may be radially and circumferentially varied, said latter means comprising slots in both said branch and said arm coinciding with one another and means for bolting said branch and arm through said slots.

3. A material spreading device of the type described comprising means having a chute and an orifice facing downward for directing the flow of material out of the orifice, a plate having upwardly projecting vane elements extending radially outwardly from a center, a motor having a vertical shaft on which said plate is mounted, means having an arm extending outward from the motor for supporting the same, a bracket extending from said chute having a branch in juxtaposition to said arm, and means including said branch and arm for horizontally adjusting the position of the plate with reference to the said orifice whereby the location of the orifice relative to the axis of rotation of the plate established by the motor shaft may be radially and circumferentially varied, said latter means comprising a series of holes in said branch and said arm positioned to coincide with one another and clamping means passing through said holes for clamping said branch and arms together.

4. A material spreading device of the type described comprising means having a hopper with an orifice facing downward for directing the flow of material, a plate mounted beneath said orifice and having upwardly projecting vanes extending radially outwardly from a center, a motor mounted below said plate and having a drive shaft connected to said plate to rotate it, means having an arm extending outwardly from the motor for supporting the same and having a slot extending lengthwise in the horizontal part of the arm, a bracket extended from the hopper and having a branch with a slot extending lengthwise in it in juxtaposition to said arm, a nut and bolt extending through the slots in the arm and bracket for holding the same together and permitting adjustment of the arm on the bracket whereby the location of the orifice relative to the axis of rotation of the plate established by the motor shaft may be varied radially and circumferentially.

5. A material spreading device of the type described comprising means having a chute with a constricted opening forming at the bottom and facing downwardly for discharging material, a butterfly valve controlling the rate of discharge and positioned within said chute, a plate having upwardly projecting vane elements extending radially outward from a center, a motor having a vertical shaft on which said plate is mounted, means having an arm extending outward from the motor for supporting the same, a bracket extending from said chute having a branch in juxtaposition to said arm, and means including said branch and arm for horizontally adjusting the position of the plate with reference to the said constricted opening whereby the location of discharge of the material from the opening may be radially and circumferentially adjusted relative to the axis of rotation of the plate established by the motor shaft.

References Cited in the file of this patent

UNITED STATES PATENTS

| | | |
|---|---|---|
| 684,270 | Kornreich | Oct. 8, 1901 |
| 731,404 | Gray | June 16, 1903 |
| 866,903 | Allbritton | Sept. 24, 1907 |
| 1,033,297 | Barth | July 23, 1912 |
| 1,680,843 | Bechaud | Aug. 14, 1928 |
| 1,977,351 | Phillips | Oct. 16, 1934 |
| 2,323,262 | Warren | June 29, 1943 |
| 2,538,886 | Skibbe et al. | Jan. 23, 1951 |
| 2,560,431 | Garber | July 10, 1951 |
| 2,561,002 | Weeks | July 17, 1951 |
| 2,601,540 | Marcus et al. | June 24, 1952 |